United States Patent
Ovsiannikov

(10) Patent No.: US 9,716,819 B2
(45) Date of Patent: Jul. 25, 2017

(54) IMAGING DEVICE WITH 4-LENS TIME-OF-FLIGHT PIXELS AND INTERLEAVED READOUT THEREOF

(71) Applicant: Samsung Electronics Co., Ltd., Suwon-si, Gyeonggi-do (KR)

(72) Inventor: Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 301 days.

(21) Appl. No.: 14/599,444

(22) Filed: Jan. 16, 2015

(65) Prior Publication Data

US 2016/0094834 A1    Mar. 31, 2016

Related U.S. Application Data

(60) Provisional application No. 62/057,213, filed on Sep. 29, 2014.

(51) Int. Cl.
*H04N 5/00* (2011.01)
*H04N 5/225* (2006.01)
*H04N 5/232* (2006.01)

(52) U.S. Cl.
CPC ......... *H04N 5/2258* (2013.01); *H04N 5/2329* (2013.01)

(58) Field of Classification Search
CPC .. G06G 5/00; G06G 5/08; G06F 3/011; G06F 3/0428; G06F 3/0304; G06F 3/017; A63F 2300/1093; G01C 3/08; G01S 17/89; G01S 7/497; G06T 17/00; H04N 13/00; H04N 13/02; H04N 13/0011; H04N 13/0022; H04N 13/0242; H04N 13/025; H04N 13/0271
See application file for complete search history.

(56) References Cited

U.S. PATENT DOCUMENTS

| | | | | |
|---|---|---|---|---|
| 3,978,337 | A * | 8/1976 | Nickles et al. | G01T 1/1642 250/363.01 |
| 7,170,492 | B2 * | 1/2007 | Bell | G06F 3/011 345/156 |
| 7,978,239 | B2 | 7/2011 | Deever et al. | |
| 8,405,750 | B2 | 3/2013 | Smith et al. | |

(Continued)

OTHER PUBLICATIONS

Hansard et al. Time of Flight Cameras: Principles, Methods, and Applications. Springer, pp. 95, 2012, SpringerBriefs in Computer Science, ISBN 978-1-4471-4658-2.*

*Primary Examiner* — Frank Huang
(74) *Attorney, Agent, or Firm* — Renaissance IP Law Group LLP

(57) ABSTRACT

Ranging devices, systems, and methods are provided. In embodiments, a device includes a casing with four openings and an array with depth pixels. The depth pixels are arranged in four quadrants, so that pixels in each of the quadrants receive light through one of the four openings. The depth pixels may generate samples in response to the received light. For a certain frame, a controller reads out samples from each of the quadrants before completing reading out the samples of any one of the quadrants. In some embodiments, reading out is performed by using interleaved rolling shutter for the rows.

14 Claims, 4 Drawing Sheets

(56) References Cited

U.S. PATENT DOCUMENTS

| | | | |
|---|---|---|---|
| 8,587,771 B2* | 11/2013 | Xu et al. | G01S 17/89 356/3.01 |
| 9,094,675 B2* | 7/2015 | Lukk et al. | H04N 13/0011 |
| 9,194,953 B2* | 11/2015 | Schmidt et al. | G01S 17/89 |
| 9,220,462 B2* | 12/2015 | Sethi | A61B 5/6898 |
| 9,253,380 B2* | 2/2016 | Venkataraman et al. | H04N 5/2252 |
| 2010/0128108 A1 | 5/2010 | Song et al. | |
| 2013/0278802 A1 | 10/2013 | Attar et al. | |

* cited by examiner

*IMAGING DEVICE*

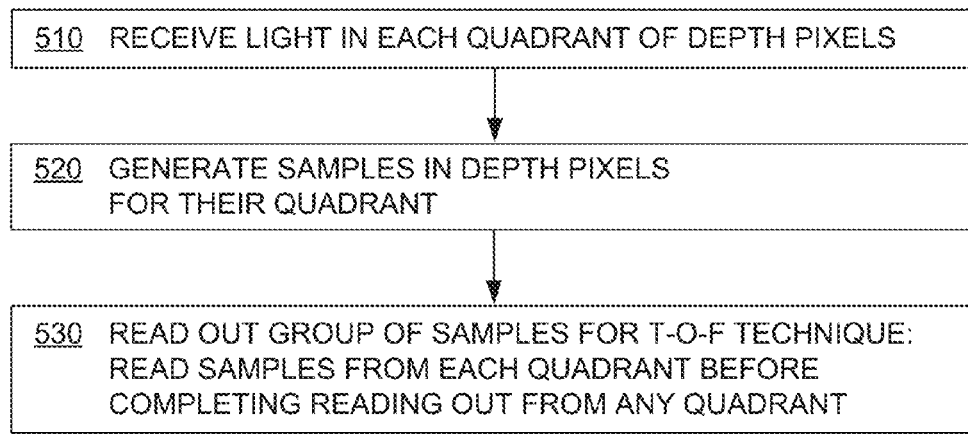
FIG. 5     METHODS
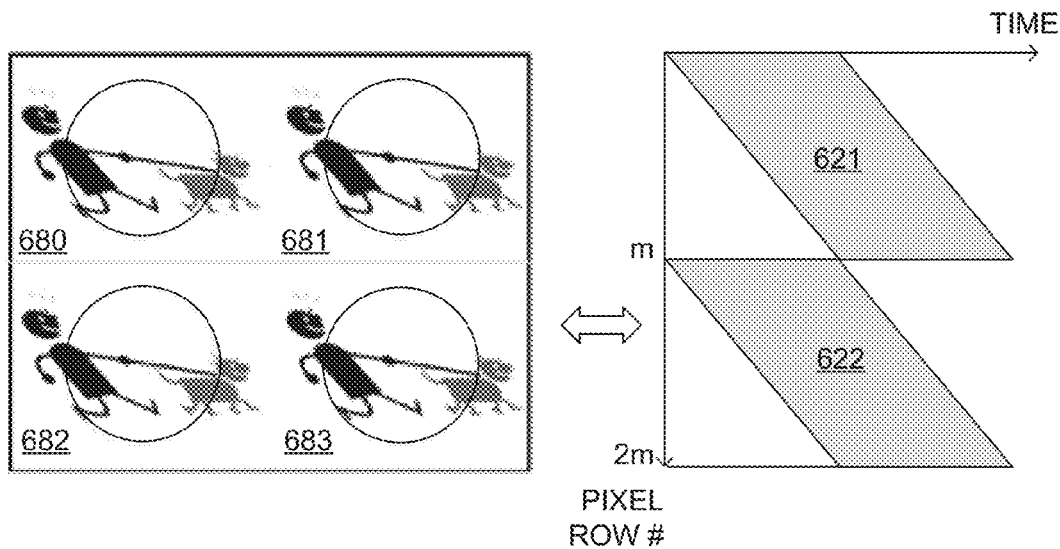
FIG. 6     DEPTH EXPOSURE MATCHING

IMAGING DEVICE WITH 4-LENS TIME-OF-FLIGHT PIXELS AND INTERLEAVED READOUT THEREOF

CROSS REFERENCE TO RELATED PATENT APPLICATIONS

This patent application claims priority from U.S. Provisional Patent Application Ser. No. 62/057,213, filed on Sep. 29, 2014, the disclosure of which is hereby incorporated by reference for all purposes.

BACKGROUND

Ranging devices can be used for ranging, i.e. determining the distance of the device from a person, object or scene. The distance is also known as range. In some instances imaging devices, which include cameras, are also capable of ranging. This is why descriptions of a certain types of ranging devices sometimes resemble descriptions of cameras.

Modern imaging devices use pixels to capture images. The pixels divide an input image in elements, and capture values for the elements of the image. These values for the image are captured by various techniques, such as numbers of electrons per pixel after a brief exposure time. The output image is typically constructed from the captured values, whether in color or in black and white.

BRIEF SUMMARY

The present description gives instances of devices, systems, and methods, the use of which may help overcome problems and limitations of the prior art.

In embodiments, a device includes a casing with four openings. The device also includes an array with depth pixels. The depth pixels can be arranged in four quadrants, so that pixels in each of the quadrants receive light through one of the four openings. The depth pixels may generate samples in response to the received light. For a certain frame, a controller reads out samples from each of the quadrants before completing reading out the samples of any one of the quadrants. In some embodiments, reading out is performed by using interleaved rolling shutter for the rows.

An advantage over the prior art is that artifacts from motion, which could cause channel misregistration, can be reduced or even eliminated. Moreover, a buffer used in the prior art for half a frame might not be necessary, therefore reducing image processing memory size and thus device cost. Additionally, image processing lag can be reduced.

These and other features and advantages of this description will become more readily apparent from the Detailed Description, which proceeds with reference to the associated drawings in which:

BRIEF DESCRIPTION OF THE DRAWINGS

FIG. 5 is a flowchart for illustrating methods according to embodiments.

FIG. 6 is a diagram illustrating samples generated by depth pixels in different quadrants as four phases of a time-of-flight technique, and time relationships of among groups of these samples.

DETAILED DESCRIPTION

As has been mentioned, the present description is about devices, systems, and methods. Embodiments are now described in more detail.

Figure 1:
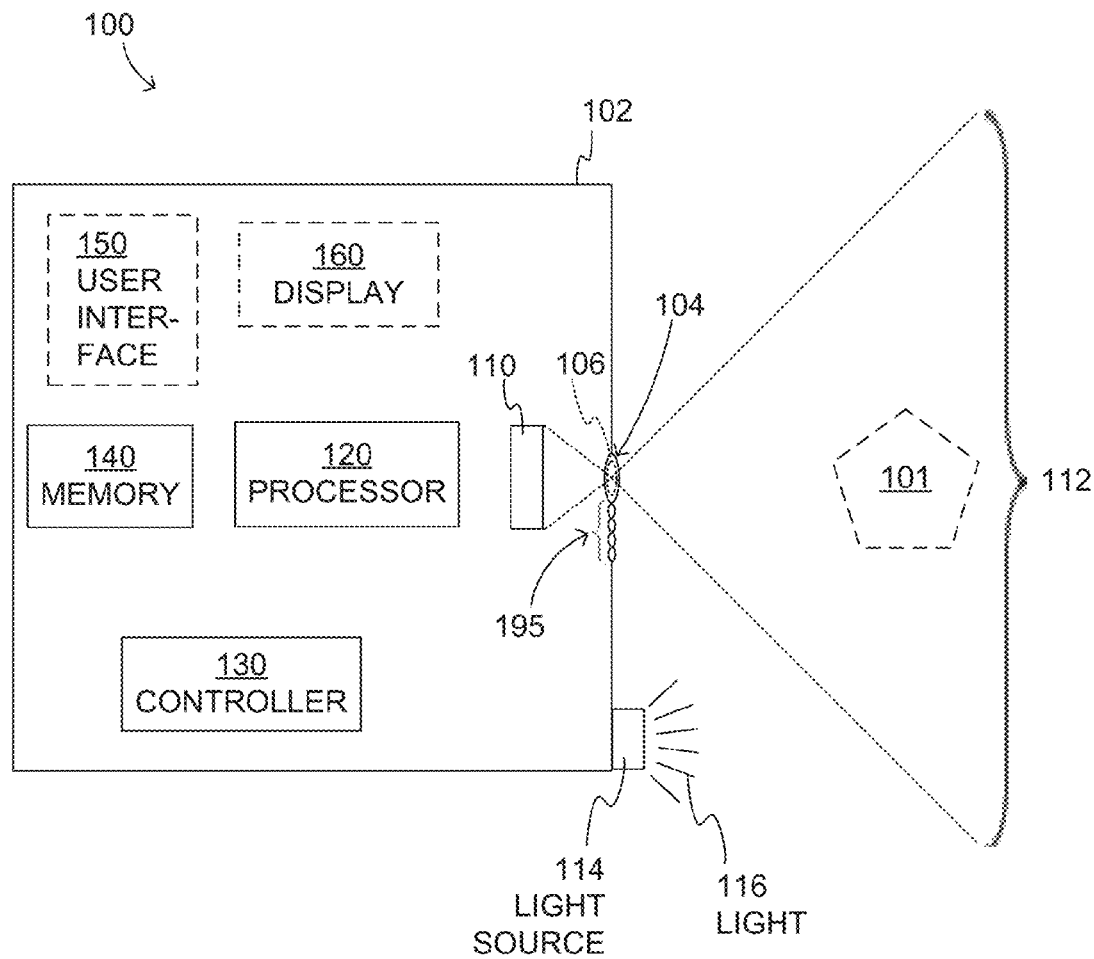
FIG. 1 is a block diagram of a sample device made according to embodiments.

FIG. 1 is a block diagram of a device 100, which can be implemented according to many different embodiments. Device 100 could have many embodiments. For example, device 100 may be a ranging device, configured to determine a distance of object 101 from device 100. That distance is also called the range.

For another example, device 100 may be an imaging device, configured to capture an image of an object 101. In some embodiments, device 100 is both an imaging device and a ranging device.

Device 100 can have a casing 102 that can also be called housing. An opening 104 is provided in casing 102, which will be used for the image. A lens 106 may be provided optionally at opening 104. In embodiments, four additional openings 195 are provided in casing 102. These openings 195 are openings for obtaining depth data, so as to ultimately construct a depth image. In embodiments, openings 195 are provided in a 2×2 matrix, with two openings 195 in a top row, and another 2 in the bottom. They may also have lenses, etc.

Device 100 also has a pixel array 110. Pixel array 110 is configured to receive light through opening 104, and capture it. Accordingly, pixel array 110, opening 104 and lens 106 define a field of view 112. Of course, field of view 112 and object 101 are in three dimensions, while FIG. 1 shows them in two dimensions.

Casing 102 can be aligned, so that object 101, or a person or a scene as desired, will be brought within field of view 112, so that it presents an input image. A light source 114, such as an LED, may be further provided on casing 102, so as to assist in the imaging and/or ranging operation of device 100. Light source 114 can be configured to transmit light 116 towards field of view 112, so as to illuminate persons and objects within it. Light 116 can be reflected by object 101 and then be received via opening 104, in addition to ambient light received by reflection from object 101. Accordingly, light source 114 can assist in imaging by illuminating object 101 better. Or, light source 114 can assist in ranging by modulating transmitted light 116 in a way that is already known to device 100. Light source 114 may be operating in response to a drive signal, and thus it may modulate transmitted light 116 similarly to how the drive signal is modulated.

As mentioned above, pixel array 110 can capture light received via opening 104. More particularly, in many embodiments, pixel array 110 has a two-dimensional array of pixels, which are also sometimes known as sensors. The pixels can be arranged in rows and columns, although other arrangements are also possible. When the pixels are exposed to an input image, i.e. receive light from the image, they generate signals in response to the light they receive. Typically these signals are in the form of electric charges. By their magnitude, these signals encode individual sensed values for the light, which is why they are also called samples. Taken together, the samples may render an output image that is a version of the sensed input image. This is also why the entire pixel array 110 is sometimes called an image sensor.

The pixels mentioned above can also be called image pixels, since they help recreate the input image, for the imaging function. In embodiments, depth pixels may be included for a ranging function, which are additional to Image pixels. These depth pixels may be part of image array 110, or of a separate array, and can operate the same way as the image pixels, except that they ultimately help create a depth image.

Device 100 may additionally include a processor 120. Processor 120 may perform image processing functions upon receiving the signals or samples from pixel array 110. Processor 120 may also perform additional functions, for example adjust imaging parameters of the samples, of the exposure, etc.

Device 100 may further include a controller 130, which can be configured to control the operation of pixel array 110 and other components of device 100. In some embodiments, controller 130 receives inputs from processor 120. Processor 120 and/or controller 130 can be implemented with one or more Central Processing Units (CPUs), digital signal processors, microprocessors, microcontrollers, application-specific integrated circuits (ASICs), programmable logic devices (PLDs), and so on. Controller 130 may optionally be formed integrally with pixel array 110, processor 120, and possibly also with other components of device 100, perhaps in a single integrated circuit. Controller 130 may control and operate pixel array 110, by transmitting control signals from output ports, and so on, as will be understood by those skilled in the art.

Device 100 may further include a memory 140. The samples can be stored in memory 140, preferably as digital values representing the signals generated by the pixels. The samples may be further processed before and/or after being stored in memory 140. In embodiments, memory 140 is configured to store final samples computed by processor 120 as the output image.

Device 100 may moreover include a user interface 150, which can be configured to receive inputs from the user. The inputs can be for controlling the operation of device 100, such as for adjusting imaging parameters and/or image processing parameters. In some embodiments, interface 150 is implemented by one or more standalone components, such as actuators, buttons, circular wheels and the like on casing 102.

Optionally, device 100 also includes a display 160, which can be considered to be part of user interface 150. Display 160 can include a screen. When provided, display 160 can display the samples as the rendered image. A user can view this image, and use it to better align casing 102, so that object 101 will be placed within field of view 112. Moreover, a user may decide to adjust imaging parameters and/or image processing parameters while receiving feedback from the image displayed in display 160. The screen of display 160 can be a touchscreen, through which inputs can be received by the user.

Figure 2:
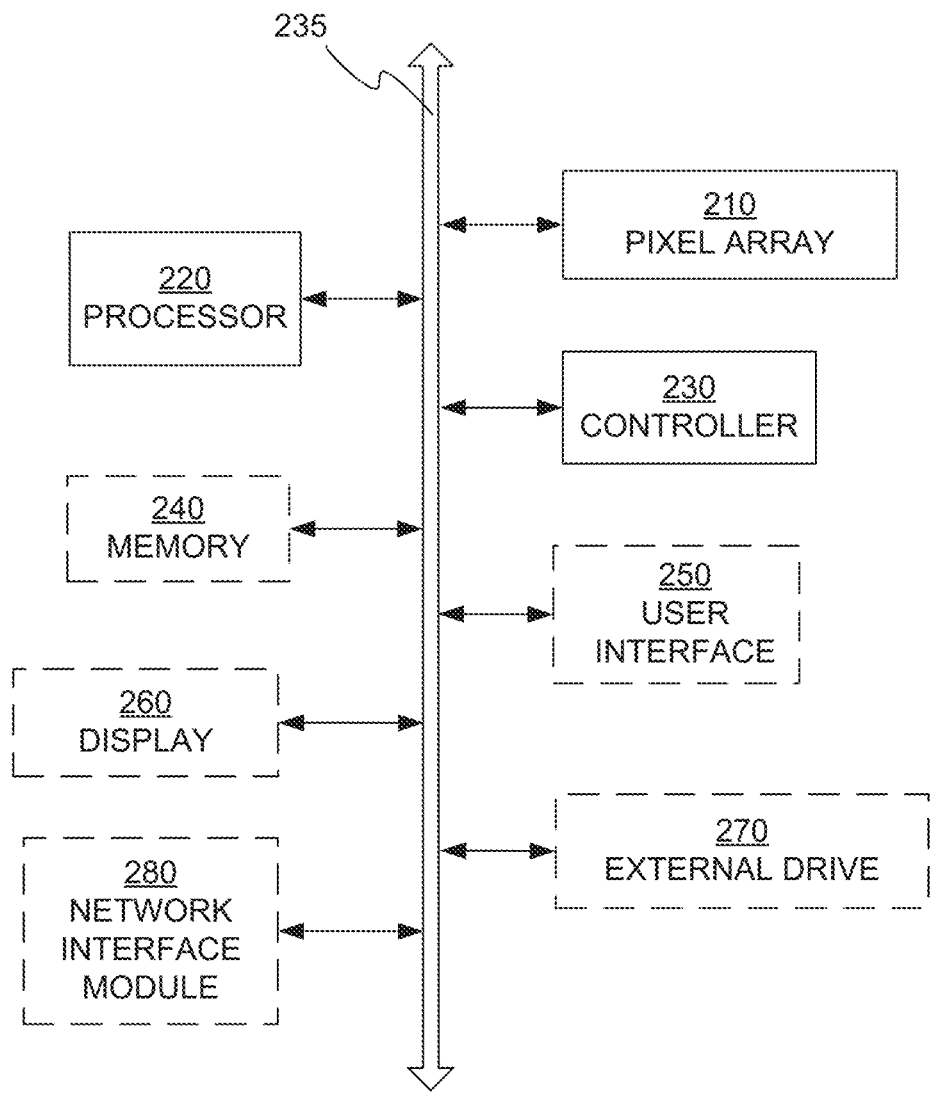
FIG. 2 depicts a sample controller-based system made according to embodiments.

FIG. 2 depicts a controller-based system 200 for a device made according to embodiments. As will be appreciated, system 200 can include components of device 100 of FIG. 1.

System 200 includes a pixel array 210 that is made according to embodiments, and which could be pixel array 110 of FIG. 1. As such, system 200 could be, without limitation, a computer system, an imaging system, a camera system, a ranging system, a scanner system, a machine vision system, a vehicle navigation system, a smart telephone, a video telephone, a personal digital assistant (PDA), a mobile computer, a surveillance system, an auto focus system, a star tracker system, a motion detection system, an image stabilization system, a data compression system for high-definition television or a moving picture ("movie"), and so on.

System 200 may additionally include a processor 220 and a controller 230, which may be similar to processor 120 and to controller 130 respectively. In some embodiments, these components communicate among themselves over a bus 235, as shown in FIG. 2.

System 200 may also include a memory 240, which could the previously mentioned memory 140. Memory 240 can be a Random Access Memory (RAM), a Read Only Memory (ROM), a combination, and so on. Memory 240 may be configured to store instructions that can be read and executed by processor 220 and/or controller 230. Memory 240 may be configured to store the samples captured by pixel array 210, both for the short term and the long term.

System 200 further optionally includes a user interface 250, which can be made as the previously described user interface 150. Moreover, since system 200 does not necessarily have to be implemented with a casing, there can be more and different configurations for user interface 250, such as by using a keypad, a keyboard and so on. Memory 240 may be configured to further store user data that is accessible to a user via user interface 250.

System 200 further optionally includes a display 260, which can be considered to be part of user interface 1S0. Display 260 could be display 160 of FIG. 1, or a computer screen display, a custom display, a plasma screen, and so on. Display 260 can show to a user an image captured by pixel array 210, whether tentative or final, and so on.

Furthermore, system 200 may include an external drive 270, which can be a compact disk (CD) drive, a thumb drive, and so on. System 200 can also include a network interface module 280. System 200 may use module 280 to transmit data to or receive data from a communication network. The transmission can be via wires, for example via cables, or USB interface. Alternately, the communication network can be wireless, and module 280 can be wireless and include, for example, an antenna, a wireless transceiver and so on. The communication interface protocol can be that of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so on.

The previously mentioned depth images can be used according to time-of-flight (TOF) principles. Now they are described in more detail.

Figure 3:
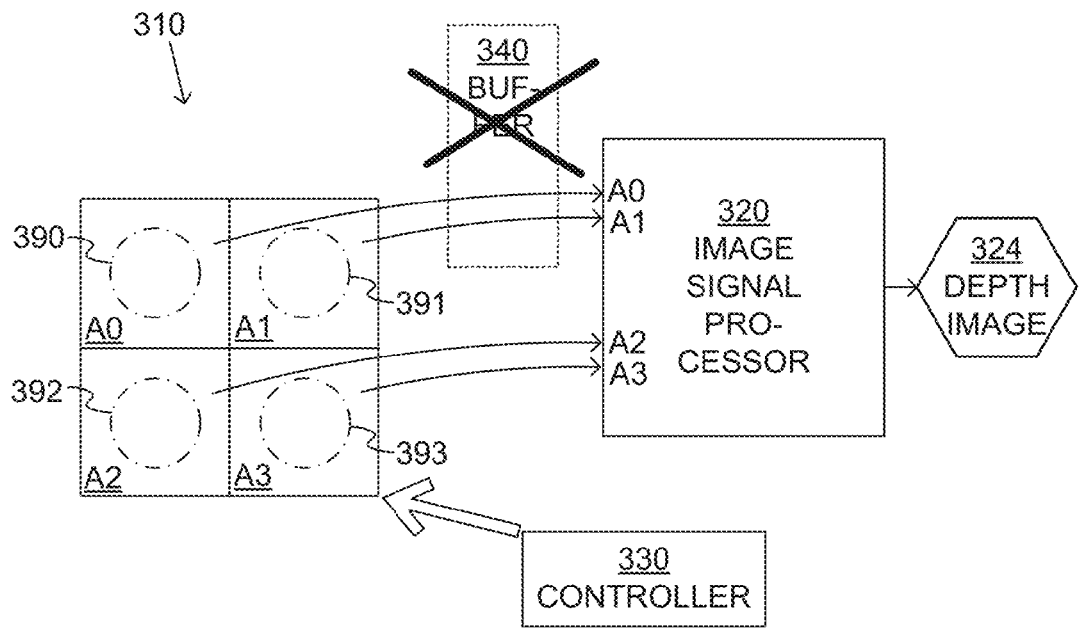
FIG. 3 is a diagram illustrating how depth pixels can be arranged in quadrants and read out, according to embodiments.

FIG. 3 shows an array 310, which is made according to embodiments. Array 310 includes depth pixels that are not shown individually. Array 310 can be a standalone pixel array, or a portion of pixel array that also includes other pixels such as image pixels.

The depth pixels of array 310 can be arranged in four quadrants A0, A1, A2 and A3. In addition, openings 390, 391, 392 and 393 are shown with reference to their respective quadrants A0, A1, A2 and A3. These openings 390, 391, 392 and 393 can be as described for openings 195 of FIG. 1. Of course, these openings 390, 391, 392 and 393 are not in the same plane as pixel array 310, and that is why they are shown in dashed lines in FIG. 3.

The pixels in quadrants A0, A1, A2 and A3 can be arranged so as to receive light through a respective one of the four openings 390, 391, 392 and 393. In other words, light received through opening 390 could be imaged by pixels in quadrant A0, and so on.

The depth pixels in array 310 can be configured to generate samples in response to the received light. The light can be received as a reflection of light 116 from object 101, so that ultimately depth can be determined using time-of-flight principles. The samples generated by each depth pixel can be for the quadrant of their respective depth pixel.

It will be recognized that this arrangement can generate four depth images, one in each of quadrants A0, A1, A2 and A3. These may have been obtained at a different time instant, i.e. at a different phase of modulated light 116, and a set of all four may be needed to ultimately generate a depth image. In other words, for obtaining the final depth information in terms of a depth image, a group of the samples will be read out. The group may include samples from all four quadrants, which are treated as the respective four phases of a time-of-flight (T-O-F) technique.

In embodiments, a controller 330, which can be the same as controller 130, may control array 310. In fact, controller 330 may be configured to control array 310 so as to read out of array 310 a group of the samples in any desired way.

In embodiments, the reading out of the group of the samples from all four quadrants as the four phases of a T-O-F technique is such that at least some samples of each quadrant have been read out, before completing reading out the samples of any one of the quadrants. In some embodiments, therefore, the samples of quadrants A0, A1, A2 and A3 are read directly into image signal processor 320. Then, these samples in the group may be combined to generate a single depth image 324 according to the time-of-flight technique.

Embodiments are different from prior art, where first quadrants A0 and A1 are completely read out pixel row by pixel row, and then quadrants A2 and A3 are read out pixel row by pixel row. In such prior art embodiments, an additional frame buffer 340 is often used to store the read out samples of quadrants A0 and A1 as the samples of quadrants A2 and A3 are read out of the pixel array.

It should be noted that present embodiments do not always need a frame buffer 340, which is why it is shown crossed out in FIG. 3. In fact, in present embodiments, after being read out of array 310 and prior to being combined by image signal processor 320, all the samples in the group may have been stored in the same one or more devices. In other words, in embodiments, none of the samples may have been stored in a buffer such as buffer 340, or all of them may have. In embodiments, the samples might not be stored in different devices based on which of the quadrants they came from.

More particular ways according to embodiments are now described. In some embodiments, the array can be oriented so that the four quadrants are arranged two in the top and the other two in the bottom. This is also the example in FIG. 3, where the quadrants are arranged two in the top (A0, A1) and the other two in the bottom (A2, A3). The depth pixels in each quadrant can be arranged in pixel rows, and reading out for the group can be performed by reading samples from at least one pixel row of the two quadrants in the top, then samples from at least one pixel row of the two quadrants in the bottom, and then samples from at least one pixel row of the two quadrants in the top.

Figure 4:
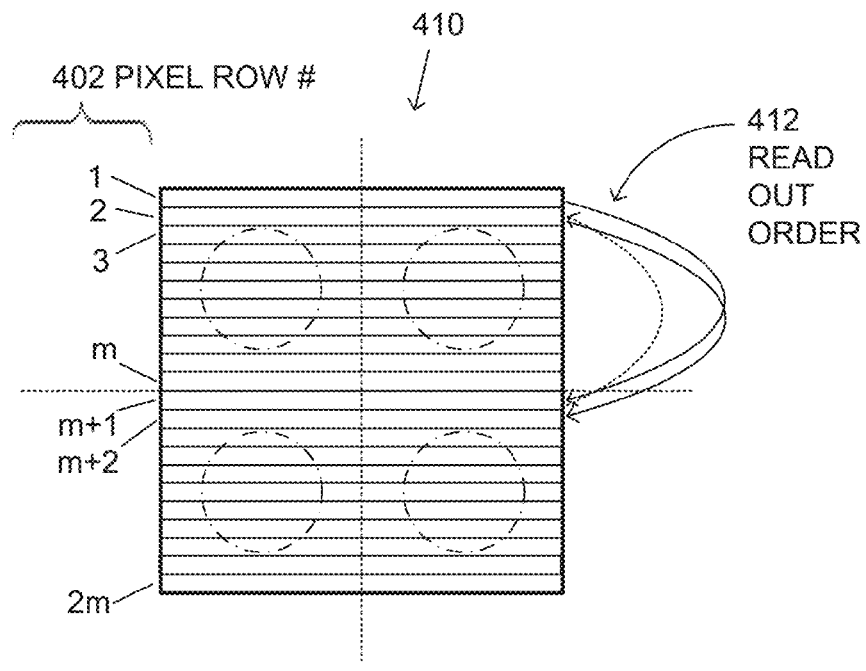
FIG. 4 is a diagram of an array illustrating interleaved reading out of rows of pixels, according to embodiments.

Another example is shown in FIG. 4, which shows an array 410. Array 410 could be the same as array 310. The division in quadrants and the openings are shown without markings, so as to not clutter the drawing.

Array 410 has depth pixels that are arranged in pixel rows. Pixel row numbers 402 are shown, ranging from 1 to 2m. Rows 1 through m could be for quadrants A0 and A1, while rows m+1 up to 2m could be for quadrants A2 and A3.

A read out order 412 is also shown by row. Specifically, samples are read from pixel row 1 of top quadrants A0, A1, then samples are read from pixel row m+1 of bottom quadrants A2, A3, and then samples are read from additional pixel row 2 of top quadrants A0, A1, etc.

In embodiments, the samples can be read out from the pixel rows in an interleaved fashion. In embodiments, the samples can be read out from the pixel rows according to a rolling shutter scheme. If this is applied to the example of FIG. 4, the full readout order would be 1>m+1>2>m+2> . . . >m−1>2m−1>m>2m.

FIG. 5 shows a flowchart 500 for describing methods according to embodiments. The methods of flowchart 500 may also be practiced by embodiments described elsewhere in this document.

According to an operation 510, light may be received in each of four quadrants. The light can be received through an opening corresponding to each quadrant.

According to another operation 520, samples can be generated in response to the received light. The samples can be generated in the depth pixels, for the quadrant of their respective depth pixels.

According to another operation 530, a group of the samples can be read out of the pixel array. The group might include samples of the four quadrants as respective four phases of a time-of-flight technique. The reading out can be such that samples of each quadrant have been read out before completing reading out the samples of any one of the quadrants.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, apparatus, device or method.

Implementation of these embodiments is now described in more detail. To this end, FIG. 6 includes two parts and illustrates advantages when capturing a scene with motion.

In the left side of FIG. 6 is a diagram illustrating samples generated by depth pixels in different quadrants 680, 681, 682 and 683. The pixels in these four quadrants can be considered as four phases of the time-of-flight technique. These pixels are represented by the information they carry, which are images of a man walking his dog. Embodiments of prior art, where first quadrants A0 and A1 are completely read out pixel row by pixel row, and then quadrants A2 and A3 are read out pixel row by pixel row, for example using a rolling shutter, would cause images captured in quadrants 680 and 681 to be considerably different from images captured in quadrants 682 and 683. Specifically, since the timing of the exposure of the scenes by quadrants 682 and 683 is delayed compared to quadrants 680 and 681, images captured by quadrants 682 and 683 would show the man and the dog having walked further to the right. For clarity, by exposure timing we mean the time when a quadrant begins its light capture for a particular frame and the time when light capture for that quadrant, for that frame ends.

However, embodiments benefit if the exposure timing of all quadrants is practically identical, for example by implementing the interleaved exposure and readout illustrated in FIG. 5.

In FIG. 6 to the right is a time diagram relating to the reading out of the samples of FIG. 6. Readout 621 is for rows 1 through m of quadrants 680 and 681, while readout 622 is for rows m+1 through 2m of quadrants 682 and 683. The Y axis indicates the row number, 1 through 2m. The X axis indicates time when light capture starts and/or ends for each row from 1 to 2m. Left edges of the slanted parallelograms 621 and 622 indicate the time when light capture starts. For example, both row 1 and row m start capturing light nearly simultaneously with each other at time zero, where Y axis crosses the X axis. For example, both row 2 and row m+1 start capturing light practically simultaneously with each other, but a short time $2*T_{ROW}$ after rows 1 and m start their light capture. Such delays of exposure timing from one row to the next row are a hallmark of rolling shutter operation in image sensors.

Right edges of the slanted parallelograms 621 and 622 indicate the time when light capture ends and readout of the accumulated sample takes place. For example, both row 1 and row m end capturing light and are read out nearly simultaneously with each other after exposure time $T_{EXP}$. For another example, both rows 2 and m+1 end capturing light and are read out nearly simultaneously with each other at time $T_{EXP}+2*T_{ROW}$. Similarly, other row pairs, e.g. row 3 and row m+2, row 4 and row m+3 and so on, begin their light capture nearly simultaneously with each other and end their light capture nearly simultaneously with each other.

For clarity of explanation, a case can be considered where a) minor parallax effects can be ignored, b) the object is assumed to be at an infinite distance away, and c) all lenses are perfectly aligned with respect to their quadrants. In this case, exposure of pixels in all quadrants correspondingly imaging a point in space will be nearly simultaneous. Thus images from all quadrants will show the man at an identical position—not some quadrants showing the man when he was on the left while other quadrants show the man after he has moved to the right.

It will be understood that there is "skewness", which is why the man and the dog appear skewed to the left. This is due to the rolling shutter technique, amplified by the fact that it takes about twice as long to roll through all the pixels in each quadrant.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

This description includes one or more examples, but that does not limit how the invention may be practiced. Indeed, examples or embodiments of the invention may be practiced according to what is described, or yet differently, and also in conjunction with other present or future technologies. Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in any number of ways, as will be apparent to a person skilled in the art after reviewing the present disclosure, beyond any examples shown in this document.

The following claims define certain combinations and subcombinations of elements, features and steps or operations, which are regarded as novel and non-obvious. Additional claims for other such combinations and subcombinations may be presented in this or a related document.

What is claimed is:

1. A device, comprising:
 a casing;
 four openings in the casing;
 an array including depth pixels that are arranged in four quadrants, the quadrants defined so that pixels in each of the quadrants are arranged to receive light through a respective one of the four openings, the depth pixels configured to generate samples for the quadrant of their respective depth pixels in response to the received light; and
 a controller configured to control the array so as to read out of the array a group of the samples, the group including samples of the four quadrants as respective four phases of a time-of-flight technique, the reading out being such that samples of each quadrant have been read out before completing reading out the samples of any one of the quadrants.

2. The device of claim 1, in which
 the controller is formed integrally with the array.

3. The device of claim 1, in which
 the samples in the group are combined to generate a single depth image according to the time-of-flight technique, and
 after being read out of the array and prior to being combined, all the samples in the group have been stored in the same one or more devices.

4. The device of claim 1, in which
 the array can be oriented so that the four quadrants are arranged two in the top and the other two in the bottom,
 the depth pixels in each quadrant are arranged in pixel rows, and
 reading out for the group is performed by reading samples from at least one pixel row of the two quadrants in the top, then samples from at least one pixel row of the two quadrants in the bottom, and then samples from at least one pixel row of the two quadrants in the top.

5. The device of claim 4, in which
 the samples are read out from the pixel rows in an interleaved fashion.

6. A controller for a device that includes a casing with four openings and an array, the array including depth pixels arranged in four quadrants, the quadrants defined so that pixels in each of the quadrants are arranged to receive light through a respective one of the four openings for a certain frame, the depth pixels configured to generate samples for the quadrant of their respective depth pixels in response to the received light, the controller configured to control the array so as to read out of the array a group of the samples, the group including samples of the four quadrants as respective four phases of a time-of-flight technique, the reading out being such that samples of each quadrant have been read out before completing reading out the samples of any one of the quadrants.

7. The device of claim 6, in which
the controller is formed integrally with the array.

8. The device of claim 6, in which
the samples in the group are combined to generate a single depth image according to the time-of-flight technique, and
after being read out of the array and prior to being combined, all the samples in the group have been stored in the same one or more devices.

9. The device of claim 6, in which
the array can be oriented so that the four quadrants are arranged two in the top and the other two in the bottom,
the depth pixels in each quadrant are arranged in pixel rows, and
reading out for the group is performed by reading samples from at least one pixel row of the two quadrants in the top, then samples from at least one pixel row of the two quadrants in the bottom, and then samples from at least one pixel row of the two quadrants in the top.

10. The device of claim 9, in which
the samples are read out from the pixel rows in an interleaved fashion.

11. A method for a device that includes a casing, four openings in the casing and an array that includes depth pixels, the depth pixels arranged in four quadrants, the method comprising:

receiving light in each of the four quadrants through a respective one of the four openings;
generating, in response to the received light, samples in the depth pixels, the samples for the quadrant of their respective depth pixels; and
reading out of the array a group of the samples, the group including samples of the four quadrants as respective four phases of a time-of-flight technique, the reading out being such that samples of each quadrant have been read out before completing reading out the samples of any one of the quadrants.

12. The method of claim 11, in which
the samples in the group are then combined to generate a single depth image according to the time-of-flight technique, and
after being read out of the array and prior to being combined, all the samples in the group have been stored in the same one or more devices.

13. The method of claim 11, in which
the array can be oriented so that the four quadrants are arranged two in the top and the other two in the bottom,
the depth pixels in each quadrant are arranged in pixel rows, and
reading out for the group is performed by reading samples from at least one pixel row of the two quadrants in the top, then samples from at least one pixel row of the two quadrants in the bottom, and then samples from at least one pixel row of the two quadrants in the top.

14. The method of claim 13, in which
the samples are read out from the pixel rows in an interleaved fashion.

* * * * *